United States Patent [19]

Tamura et al.

[11] Patent Number: 5,277,564
[45] Date of Patent: Jan. 11, 1994

[54] CLOSED TYPE SCROLL COMPRESSOR WITH SPHERICAL SLIDE BEARING FOR THE OIL TUBE

[75] Inventors: Takahiro Tamura, Shimizu; Kazuo Sakurai, Shizuoka; Masashi Miyake; Mutsunori Matsunaga, both of Shimizu, all of Japan

[73] Assignee: Hitachi, Ltd., Tokyo, Japan

[21] Appl. No.: 913,833

[22] Filed: Jul. 16, 1992

[30] Foreign Application Priority Data

Jul. 18, 1991 [JP] Japan ................... 3-177969

[51] Int. Cl.5 ............ F04C 18/04; F04C 23/00; F04C 29/02; F16L 27/04
[52] U.S. Cl. .................... 418/55.6; 418/58; 418/94; 184/6.16; 184/6.18; 285/166
[58] Field of Search ............ 418/55.6, 58, 94, 96; 184/6.16, 6.18; 285/166, 261; 384/206

[56] References Cited

U.S. PATENT DOCUMENTS

| 2,175,752 | 10/1939 | Gray ..................... 285/166 |
| 3,133,754 | 5/1964 | Peters ................... 285/166 |
| 4,776,617 | 10/1988 | Sato .................... 285/166 |
| 5,112,201 | 5/1992 | Tamura et al. ........... 418/55.6 |

FOREIGN PATENT DOCUMENTS

2-64280  3/1990  Japan .................. 418/55.6
2-157493 6/1990  Japan .

Primary Examiner—John J. Vrablik
Attorney, Agent, or Firm—Antonelli, Terry, Stout & Kraus

[57] ABSTRACT

A closed type scroll compressor has a drive shaft supported by a frame through bearings lubricated with a lubricating oil supplied from an oil reservoir via a lubricating oil passage bore formed in the drive shaft. The end of the drive shaft in which the upstream end of the lubricating oil passage bore opens is connected to the oil reservoir through a joint tube which is supported by supporting structures including a combination of a spherical slide bearing and slide bearing and capable of taking up any mounting error or displacement of the drive shaft in any direction. The compressor can be assembled easily without any risk of uneven or local contact of each sliding portion.

6 Claims, 6 Drawing Sheets

CLOSED TYPE SCROLL COMPRESSOR WITH SPHERICAL SLIDE BEARING FOR THE OIL TUBE

BACKGROUND OF THE INVENTION

The present invention relates to a closed type scroll compressor suitable for use in a refrigeration cycle of an air conditioner, refrigerator or the like system and, more particularly, to a closed type scroll compressor having an improved lubricating system for lubricating a bearing of the compressor.

Japanese Unexamined Patent Publication No. 2-157493 discloses a closed type scroll compressor having a lubricating system, with the scroll compressor including a motor cover disposed near an end of a drive shaft adjacent to a driving motor and a bearing for supporting the end of the drive shaft. The motor cover is fixed to a frame by bolts. A lubricating oil pipe is provided between the motor cover and a lubricating oil reservoir, thus providing a lubricating oil passage for lubricating the bearing.

Japanese Patent Application No. 1-271661 (Unexamined Patent Publication 3-134,288) discloses a scroll compressor having a different type of lubricating system, wherein a lubricating oil pump is provided on the end surface of a drive shaft adjacent a driving motor. The lubricating oil pump is supported by bolts which serve to fix the stator of the driving motor. The lubricating oil pump is mounted by using a resilient force of a spring such that a gap is formed between the lubricating oil pump and a housing, so as to be able to rotate relative to the housing. The lubricating oil is driven to lubricate a bearing of the compressor.

In the known scroll compressors of the type described above, the member providing the lubricating oil passage on the end of the drive shaft near the driving motor is fixed to the motor or to the frame by screws or bolts and, therefore, is substantially fixed with respect to the axis or center of the drive shaft. The known arrangement can suitably be employed in the case where the compressor is completed by assembling the compression mechanism portion, drive shaft, motor portion and the lubricating oil passage and then mounting these assembled parts as a unit in a hermetic casing. However, the known arrangement cannot be adopted in the case where, for example, the stator of the motor is press-fitted in the hermetic casing because, in such a case, no bolt is available for fixing the member defining the lubricating oil passage.

This problem is serious particularly in the compressor of the type proposed in Japanese Patent Application No. 1-271661. Namely, in this type of compressor, the cover is inclined as a result of an inclination of the end surface of the motor, which causes an unevenness in the bearing gap between the bearing surface and the shaft, leading to a serious problem such as burning of the bearing. Furthermore, assembly cannot be conducted easily due to difficulty encountered in locating the lubricating oil pipe to the cover when the pipe is to be connected to the cover.

The arrangement disclosed in Japanese Unexamined Patent Publication No. 2-157493 is adoptable only when the oil reservoir is formed as a part of the hermetic casing. Namely, this arrangement cannot apply to a case where the oil reservoir is formed separately from the hermetic casing. It is not practical to extend the lubricating oil pipe to the exterior of the hermetic casing, considering difficulty encountered in assembly of the compressor.

SUMMARY OF THE INVENTION

Accordingly, a first object of the present invention is to provide a closed type scroll compressor which has a large tolerance to an mounting error and which can form a lubricating oil passage with reduced unevenness of contact of sliding part with the bearing surface.

A second object of the present invention is to provide a closed type scroll compressor having a lubricating system which can be assembled without difficulty even when an oil reservoir is provided outside the compressor.

To achieve the first object, the present invention provides an improvement in a closed type scroll compressor of the type which comprises a compression mechanism portion including stationary and orbiting scroll members each having a base plate and a spiral wrap integral with the base plate, with the scroll members being arranged with their wraps meshing with each other. An anti-rotation mechanism prevents the orbiting scroll member from rotating about its own axis, and a drive shaft causes the orbiting scroll member to orbit relative to the stationary scroll member. A frame includes bearings for supporting the drive shaft with electric driving motor being drivingly connected to the drive shaft. A hermetic casing accommodates the compression mechanism portion and the driving motor. An oil passage bore is formed in the drive shaft and defines a lubricating oil passage through which a lubricating oil is supplied to the bearings, with the lubricating oil passage bore communicating with a lubricating oil supply passage through a joint tube at least one end of which is supported by a spherical slide bearing.

According to the invention, a hermetic scroll compressor comprises a compression mechanism portion including stationary and orbiting scroll members each having a base plate and a spiral wrap integral with the base plate, with the scroll members being arranged with their wraps meshing with each other, and an anti-rotation mechanism prevents the orbiting scroll member from rotating about its own axis. A horizontal drive shaft causes the orbiting scroll member to orbit relative to the stationary scroll member, and a frame includes bearings for supporting the drive shaft. An electric driving motor is drivingly connected to the drive shaft, with a hermetic casing accommoding the compression mechanism portion and the driving motor. The drive shaft has formed therein an oil passage bore defining a lubricating oil passage through which a lubricating oil is supplied to the bearings, with the lubricating oil passage bore communicating with an oil reservoir provided in the casing through a joint tube at least one end of which is supported by a spherical slide bearing.

To achieve the second object of the present invention, a compressor system includes at least one closed type scroll compressor and an oil reservoir, with the compressor comprising compression mechanism including stationary and orbiting scroll members each having a base plate and a spiral wrap integral with the base plate, and with the scroll members being arranged with their wraps meshing with each other. An anti-rotation mechanism prevents the orbiting scroll member from rotating about its own axis, and a drive shaft causes the orbiting scroll member to orbit relative to the stationary scroll member. A frame includes bearings for supporting the drive shaft, with an electric driving motor being drivingly connected to the drive shaft, and with a hermetic casing encasing the compression mechanism portion and the driving motor. The drive shaft has formed therein an oil passage bore defining a lubricating oil passage through which a lubricating oil is supplied to the bearings, with the lubricating oil passage bore communicating with a lubricating oil supply passage through a joint tube at least one end of which is supported by a spherical slide bearing. The oil reservoir is disposed outside the hermetic casing, and the lubricating oil passage is connected though a lubricating oil supply pipe to the reservoir. The hermetic casing is connected to the reservoir through a compressed gas discharge pipe.

When a plurality of the hermetic scroll compressors are employed, each of the hermetic scroll compressors is connected to the oil reservoir through both the compressed gas discharge pipe and the lubricating oil supply pipe. In this case, the compressed gas discharge pipe has a check valve mounted thereon and the lubricating oil supply pipe has a solenoid valve mounted thereon.

The compressed gas discharge pipe may preferably be connected to a portion of the hermetic casing which is at substantially the same level as and opposite to the portion where the lubricating oil supply pipe is connected to the hermetic casing.

Thus, in the hermetic scroll compressor of the present invention, a lubricating oil passage bore for supplying a lubricating oil to bearings supporting the drive shaft is formed in the drive shaft so as to open in the end surface of the drive shaft adjacent the driving motor. On this end of the drive shaft, there is provided a slide bearing or a spherical slide bearing or a bearing or a seal having a combination of such slide bearings. Such bearing or seal communicates with the lubricating oil passage bore in the drive shaft and supports one end of a joint tube. The other end of the joint tube is supported by a slide bearing or a spherical slide bearing or a bearing or a seal having a combination of such slide bearings. In any case, the supporting structure associated with at least one end of the joint tube has a spherical slide bearing, and the lubricating oil passage bore formed in the drive shaft communicates with an oil reservoir through the joint tube. When the oil reservoir is installed externally of the hermetic casing to communicate with the lubricating oil passage bore in the drive shaft through a lubricating oil supply line, the above-described structure for supporting the join tube affords relative movement at both ends of the joint tube, thus accommodating any dimensional or mounting error or displacement of the drive shaft.

When the hermetic scroll compressor of the present invention is of horizontal type having an internal oil reservoir defined by the bottom portion of the hermetic casing, the joint tube may be arranged simply to provide communication between the end surface of the drive shaft and the internal oil reservoir. In such a case, the joint tube is supported at its one end by the end of the drive shaft trough a supporting structure and at its other end by the wall of the hermetic casing through another supporting structure, at least one of the supporting structure having a spherical slide bearing. With this arrangement, it is possible to accommodate any displacement of the drive shaft in all directions, as well as mounting error.

When the oil reservoir is provided externally of the hermetic casing, the lubricating oil after lubrication is discharged together with the compressed gas from the compressor into the external oil reservoir where the oil is separated from the compressed gas. Consequently, circulation of the lubricating oil through the refrigeration cycle is avoided to ensure high efficiency of the refrigeration cycle.

It is possible to lubricate a plurality of hermetic scroll compressors by lubricating oil from a single oil reservoir by connecting each compressor to the oil reservoir through a discharge pipe having a check valve and a lubricating oil supply pipe having a solenoid valve.

DESCRIPTION OF THE PREFERRED EMBODIMENTS

Figure 1:
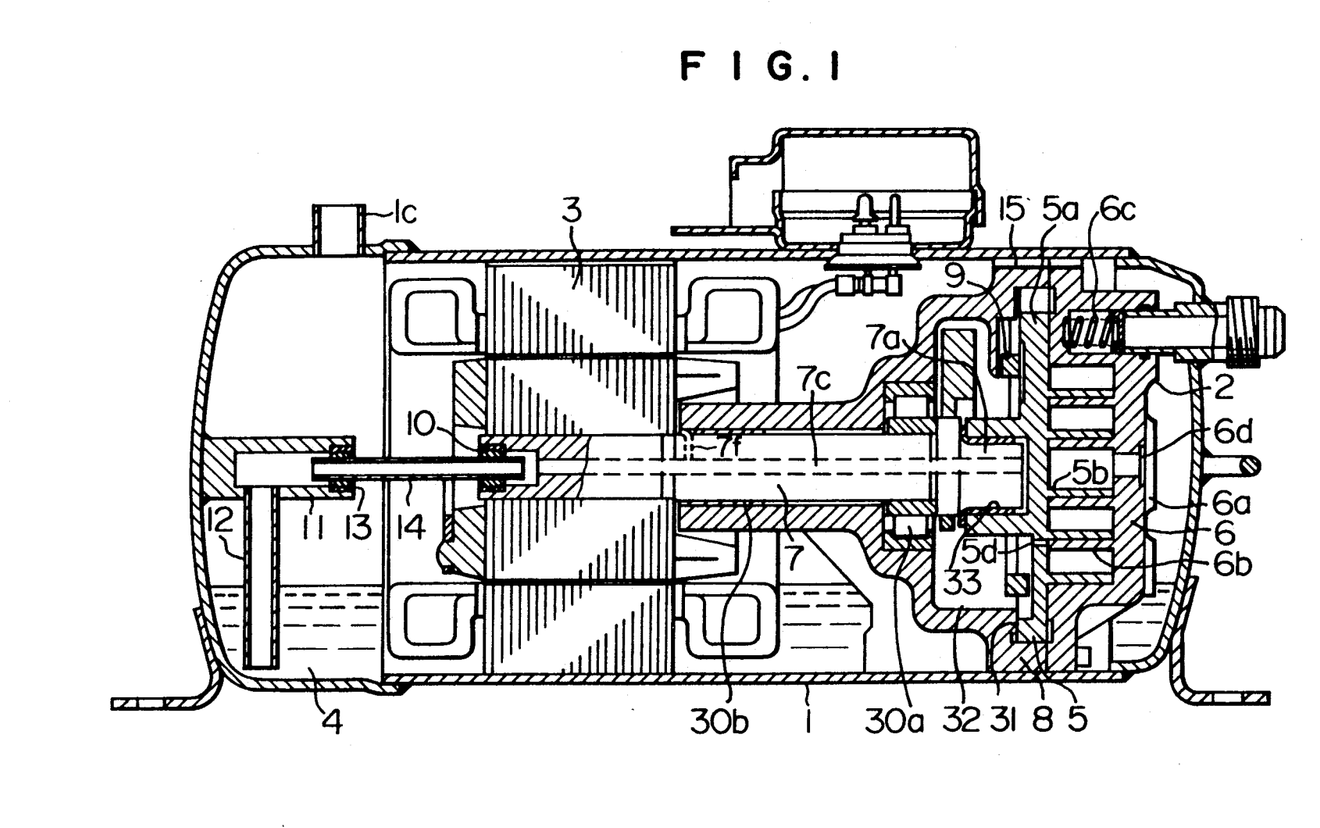
FIG. 1 is a longitudinal sectional view of a horizontal closed type scroll compressor as an embodiment of the present invention.

As shown in FIG. 1, the closed type scroll compressor of the present invention has a drive shaft laid horizontally and an oil reservoir is provided in a closed or hermetic casing. This scroll compressor has a hermetic casing 1 which accommodates a scroll compression mechanism 2 and an electric motor 3 for driving the compression mechanism. Lower or bottom portion of the space inside type casing 1 forms an oil reservoir 4. The scroll compression mechanism 2 includes an orbiting scroll member 5, a stationary scroll member 6, a crank-shaped drive shaft 7 driven by the motor 3, a frame 8 and an anti-rotation mechanism 9.

The frame 8 is fixed to the casing 1 and is provided with bearings 30a and 30b for supporting the drive shaft 7. The frame 8 also has a seat portion 31 which cooperates with the stationary scroll member 6 to sandwich therebetween the orbiting scroll member 5. The frame 8 further has a portion which defines a back pressure chamber 32 into which pressure of a suitable level is introduced to generate a force which acts to urge the orbiting scroll member 5 towards the stationary scroll member 6.

The stationary scroll member 6 is fixed to the frame 8 and has a base plate 6a and a spiral wrap 6b formed on the base plate 6a. A suction hole 6c and a discharge hole 6d are formed in the base plate 6a at radially outer and inner portions of the spiral wrap 6b. The orbiting scroll member 5 has a construction similar to that of the stationary scroll member 6: namely, it has a base plate 5a and a spiral wrap 5b formed on the base plate 5a. Both scroll members 5 and 6 are arranged such that their spiral wraps 5b and 6b mesh with each other so as to form a plurality of spaces or chambers between there two scroll members. A bearing 33c is formed on the side of the base plate 5a opposite to the stationary scroll member 6 and rotatably receives a crank-pin portion 7a of the drive shaft 7. A communication hole 5d is formed in the base plate 5a so as to provide a communication between a wrap space in compression phase and the back pressure chamber 32. Pressure of a level intermediate between the suction pressure and discharge pressure is introduced through the communication hole 5d into the back pressure chamber 32, so that the intermediate pressure is maintained in the back pressure chamber 32.

As stated before, both scroll members 5 and 6 are arranged such that their spiral wraps 5b and 5b mesh with each other, and the orbiting scroll member 5 is sandwiched between the stationary scroll member 6 and the seat portion 31 of the frame 8. The anti-rotation mechanism 9 acts between the rear surface of the orbiting scroll member 5 opposite to the stationary scroll member 6 and the frame 8, so as to prevent the orbiting scroll member 5 from rotating about its own axis. The anti-rotation mechanism 9 is formed by a key formed in an Oldahm's ring and crossing keyways formed in the orbiting scroll member 5 and in the frame 8.

The end of the drive shaft 7 remote from the motor 3 forms the crank pin 7a which is received, as described before, in the bearing 33. A lubricating oil passage bore 7c is formed in the drive shaft 7 so as to extend along the axis of the shaft 7. The lubricating oil passage bore 7c extends from the end surface of the drive shaft 7 adjacent the motor 3 and terminates in an opening in the end surface of the crank pin 7a. The lubricating oil passage bore 7c also communicate with bearings 30a and 30b through radial passage holes 7f.

A spherical slide bearing 10 is provided in the end of the drive shaft 7 adjacent the motor 3. A boss or projection 11 for piping connection is welded to the inner surface of the hermetic casing 1 at a portion which is on the extension of the axis of the drive shaft 7. A pipe 12 communicating with the oil reservoir 4 is connected to the piping connection projection 11. The end of the piping connection projection 11, remote from the drive shaft 7, is provided with a spherical slide bearing 13. A joint tube 14 is provided between the spherical slide bearings 10 and 13. With this arrangement, the lubricating oil passage bore 7c communicates with the oil reservoir 4.

In operation, the drive shaft 7 is driven by the motor 3 so that the orbiting scroll member 5 is made to orbit with respect to the stationary scroll member 6 by the revolution of the crank pin 7a. Meanwhile, the anti-rotation mechanism 9 prevents the orbiting scroll member 5 from rotating about its own axis. Consequently, each of the spaces or chambers defined between the spiral wraps 5b and 6b and base plates 5a and 6a of both scroll members are progressively shifted towards the center of the stationary scroll member 5 while decreasing its volume. Consequently, a gas introduced into such chambers through the suction hole 6c is progressively compressed and discharged through the discharge port 6d. The discharged compressed gas is then caused to flow through a passage 15 formed in the base plate 6a of the stationary scroll member 6 and in the frame 8 to reach the motor 3 thereby cooling the latter. The gas is then discharged to the exterior of the compressor through a discharge pipe 1c connected to the casing 1. During compression of the gas, the gas under compression produces a force which acts to urge the orbiting scroll member 5 away from the stationary scroll member 6. As stated before, however, the pressure of the gas in one of the wrap spaces in compression phase is introduced into the back pressure chamber 32 on the rear side of the orbiting scroll member 5 through the communication hole 5d. Thus, the back pressure chamber 32 is maintained at an intermediate pressure which is of a level intermediate between the suction and discharge pressures. This intermediate pressure produces a force which acts to urge the orbiting scroll member 5 towards the stationary scroll member 6 so as to balance or overcome the above-mentioned force tending to separate both scroll members, whereby both scroll members are held in contact with each other with a desired degree of closeness of contact.

The pressure of the compressed gas discharged from the compression mechanism portion acts on the surface of the lubricating oil in the oil reservoir 4, so that the oil is supplied from the oil reservoir 4, by the effect of the pressure differential, into the lubricating oil passage bore 7c in the drive shaft through the pipe 12, the piping connection projection 11 and the joint tube 14. Consequently, the lubricating oil passage bore 7c is filled with the lubricating oil under the discharge pressure. Meanwhile, the end surfaces of the bearings 30a and 30b adjacent the back pressure chamber 32, as well as the bearing 33, are held under the intermediate pressure, so that the lubricating oil is introduced into these bearings by the pressure differential thereby effectively lubricating these bearings.

In the described embodiment of the closed type scroll compressor of the present invention, the joint tube 14 is supported at its both ends by spherical slide bearings, so that any error incurred during mounting can effectively be taken up. The spherical bearings enable the compressor to smoothly operate, allowing the joint tube to be displaced in any direction.

The joint tube 14 is coupled to the spherical bearings 10 and 13 by combination of press-fits or interference fits. When interference fit is employed, it is possible to place a slide bearing inside the spherical slide bearing so as to further reduce the friction on the joint tube, 14.

Figure 2:
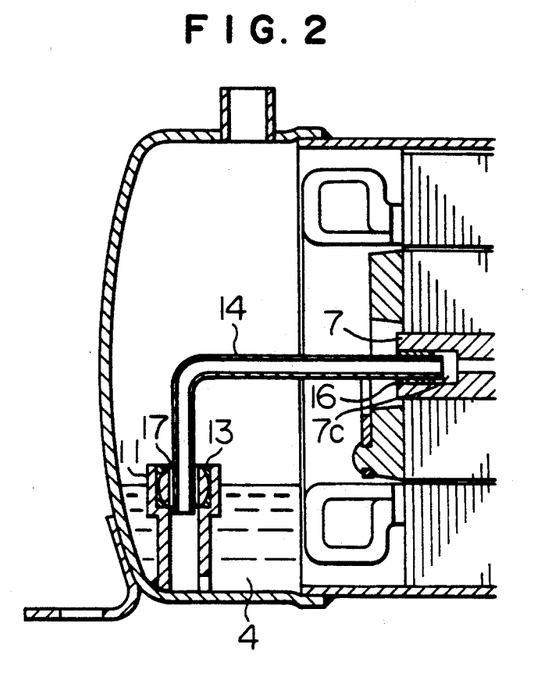
FIG. 2 is an enlarged longitudinal sectional view of a portion of a scroll compressor as another embodiment, illustrating a portion of the lubricating system.

In the embodiment of FIG. 2, the joint tube 14 is bent at 90°. The end of the joint tube 14, adjacent the drive shaft 7, is supported by a slide bearing 16, while the end of the joint tube 14 disposed in the piping connection projection 11 is supported by a combination of the spherical slide bearing 13 and a slide bearing 13. The slide bearing 16 allows the drive shaft 7 to rotate on the joint tube 14, while any displacement of the drive shaft 7 is taken up by a relative rotation in the spherical slide bearing 13.

Figure 3:
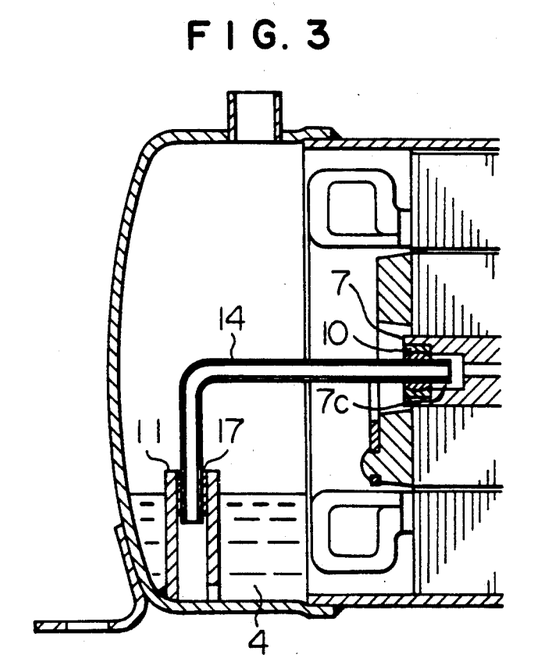
FIG. 3 is an enlarged longitudinal sectional view of a portion of a scroll compressor as still another embodiment, illustrating a portion of the lubricating system.

In the embodiment of FIG. 3, a spherical slide bearing 10 is provided on the end of the joint tube 14 adjacent the drive shaft 7, while a slide bearing 17 is provided to support the end of the joint tube 14 disposed in the piping connection projection 11. The joint tube 14 is allowed to slide on the slide bearings 10 and 17. According to this arrangement, any displacement of the drive shaft 7 is taken up by the spherical slide bearing 10, so that any excessive stress in the joint tube 14 is relieved.

Figure 4:
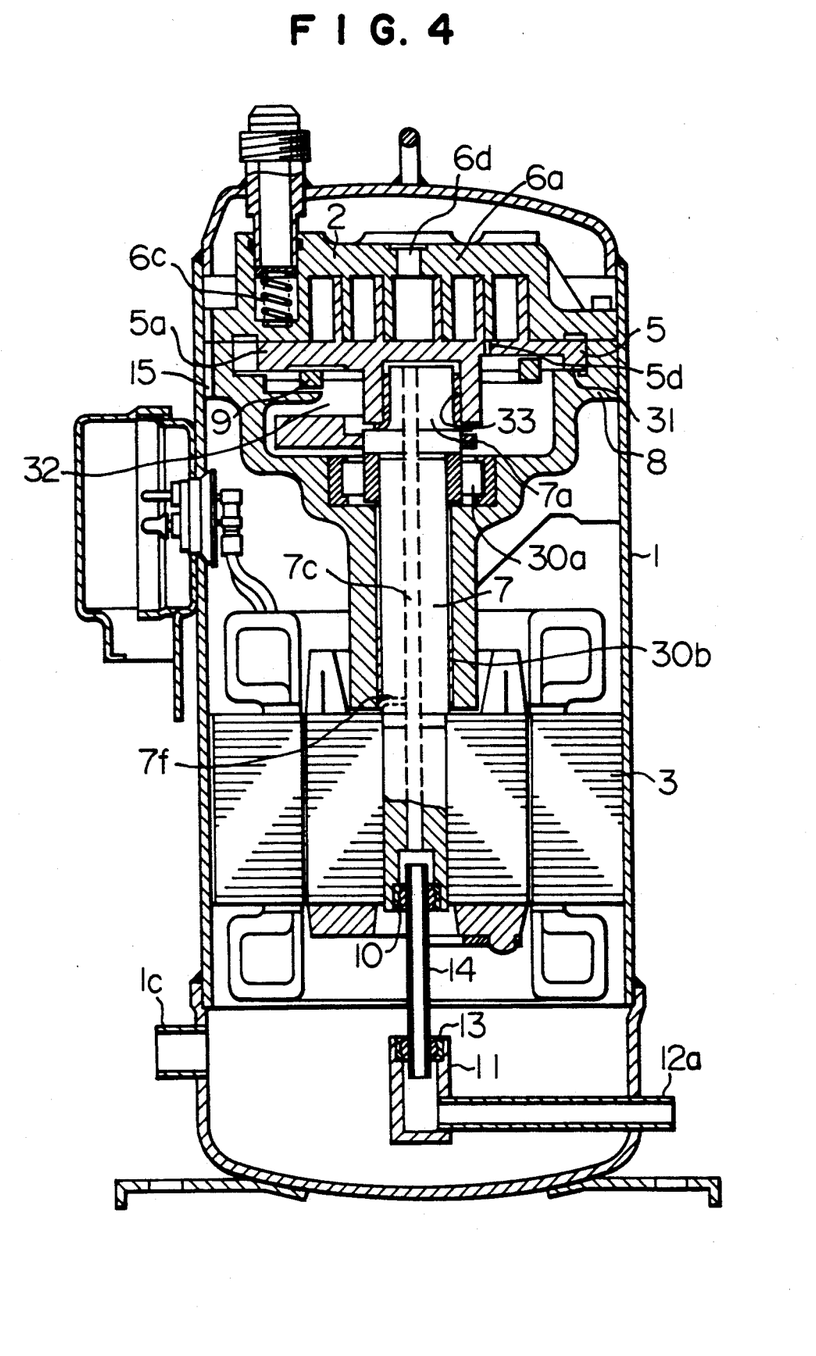
FIG. 4 is a longitudinal sectional view of a vertical closed type scroll compressor as a further embodiment of the present invention having an oil reservoir separated from the compressor.
Figure 7:
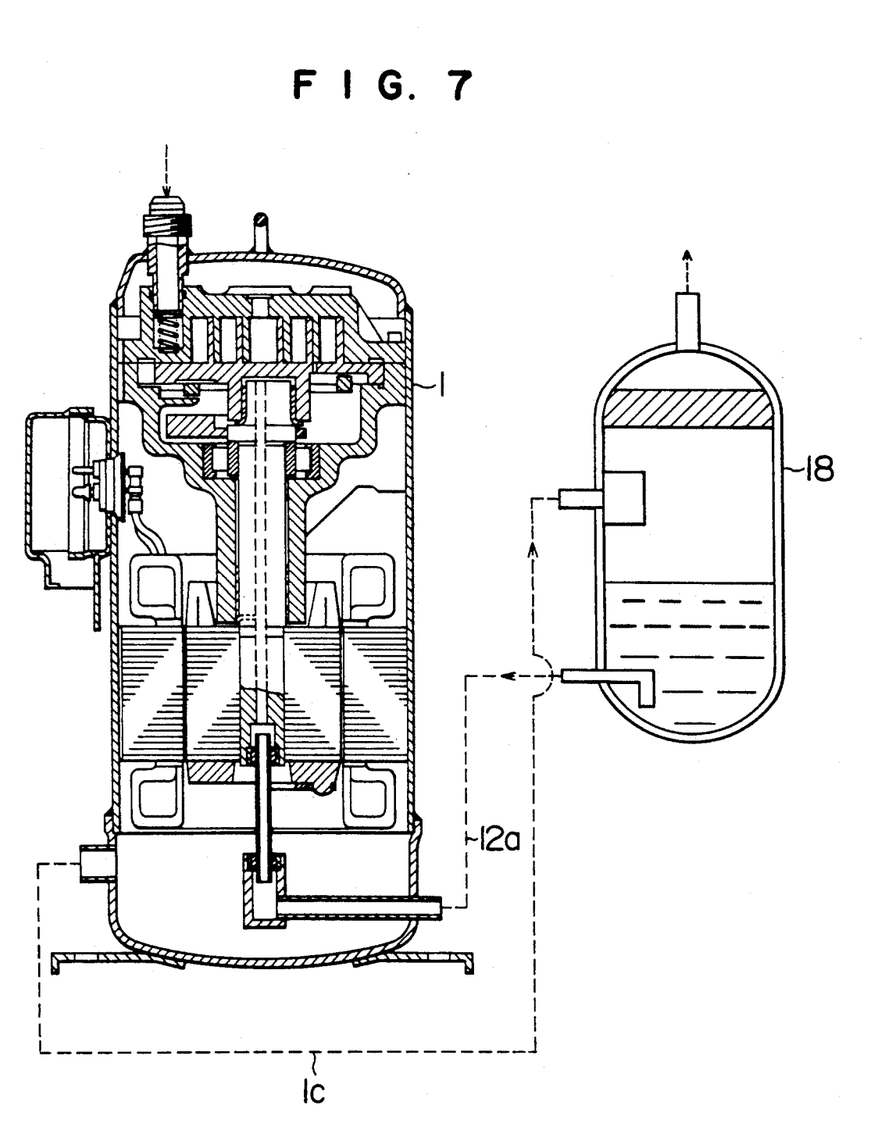
FIG. 7 is a diagram of a lubricating system used for a single compressor.

The closed type scroll compressor of the present invention of the embodiment of FIG. 4 includes an oil reservoir which is provided separately from the hermetic casing 1. Although a vertical type compressor is shown in FIG. 4, the lubricating system shown in FIG. 4 can equally be applied to a horizontal type compressor. In the embodiment of FIG. 4, a discharge pipe 1c is connected to a bottom portion of the hermetic casing 1 and connected to an oil reservoir 18 which is provided in a lubricating system shown in FIG. 7 separately from the hermetic casing 1. The oil reservoir 18 is so constructed that the lubricating oil is separated from the discharged compressed gas of refrigerant. Namely, the oil is pooled in the bottom portion of the oil reservoir 18, while the compressed refrigerant gas occupies an upper portion of the space inside the oil reservoir 18 and is then discharged therefrom so as to be circulated through the refrigeration cycle. A spherical slide bearing 13 is provided in a piping connection projection 11 disposed in the lower portion of the space inside the hermetic casing 1. The lower or bottom portion of the space inside the separate oil reservoir 18 communicates with the spherical slide bearing 13 through an oil supply pipe 12a which provides a communication between the bottom portion of the oil reservoir 18 and a space inside the piping connection projection 11. Consequently, the lubricating oil is introduced from the oil reservoir 18 into the lubricating oil passage bore 7c in the drive shaft 7 through the oil supply pipe 12a and the joint tube 14 which is provided on both ends thereof with spherical slide bearings 10 and 13. In the embodiment of FIG. 4, the piping connection projection 11 is fixed to the hermetic casing 1 by, for example, welding the oil supply pipe 12a to the wall of the hermetic casing 1. The lubricating oil thus introduced into the lubricating oil passage bores 7c is then distributed to portions requiring lubrication, as described above.

The spherical slide bearing employed in this embodiment of FIG. 4 provides the same effects as those produced by the spherical slide bearings shown in FIG. 1. The lubricating oil, after the lubrication, is temporarily stored on the bottom of the hermetic casing 1 but is soon or later discharged together with the compressed refrigerant through the discharge pipe 1c connected to the bottom of the hermetic casing 1. The oil-suspending refrigerant gas is then introduced into the oil reservoir 18 where the oil is separated from the refrigerant gas.

Figure 5:
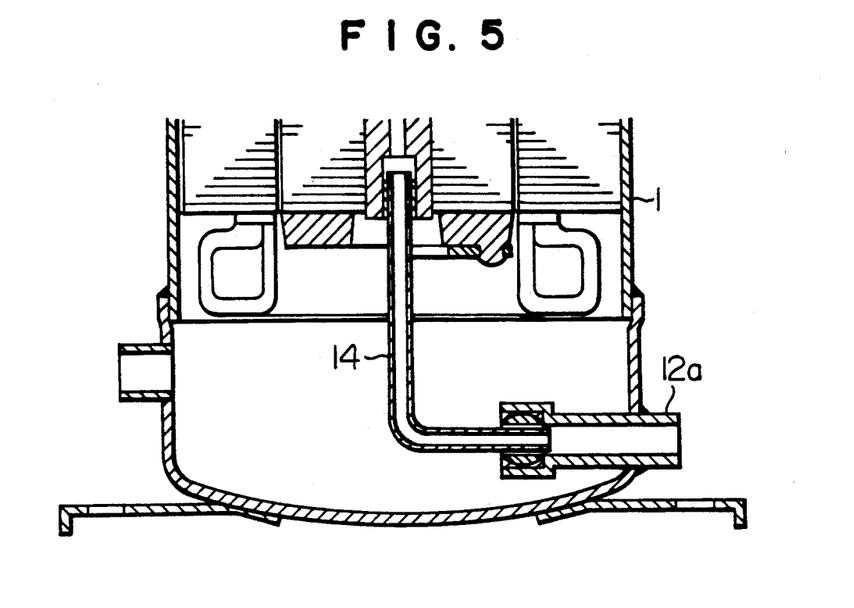
FIG. 5 is an enlarged longitudinal sectional view of a portion of a further embodiment, showing a portion of the lubricating system.
Figure 6:
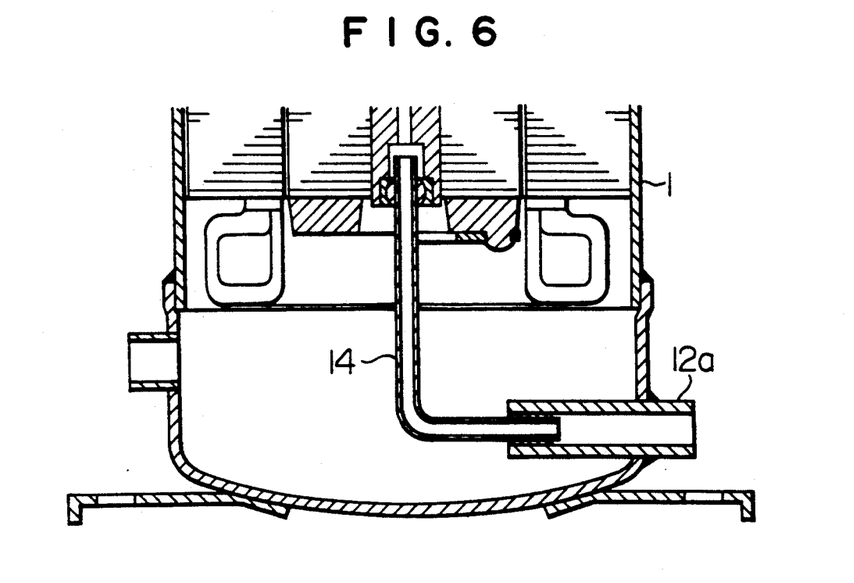
FIG. 6 is an enlarged longitudinal sectional view of a portion of a further embodiment, showing a portion of the lubricating system.

The constructions for mounting the piping connection projection 11 and the joint tube 14 in horizontal type scroll compressors, as described before in connection with FIGS. 2 and 3, can directly be applied to vertical type scroll compressors having a separate lubricating oil reservoir, as, for example, shown in FIGS. 5 and 6.

Figure 8:
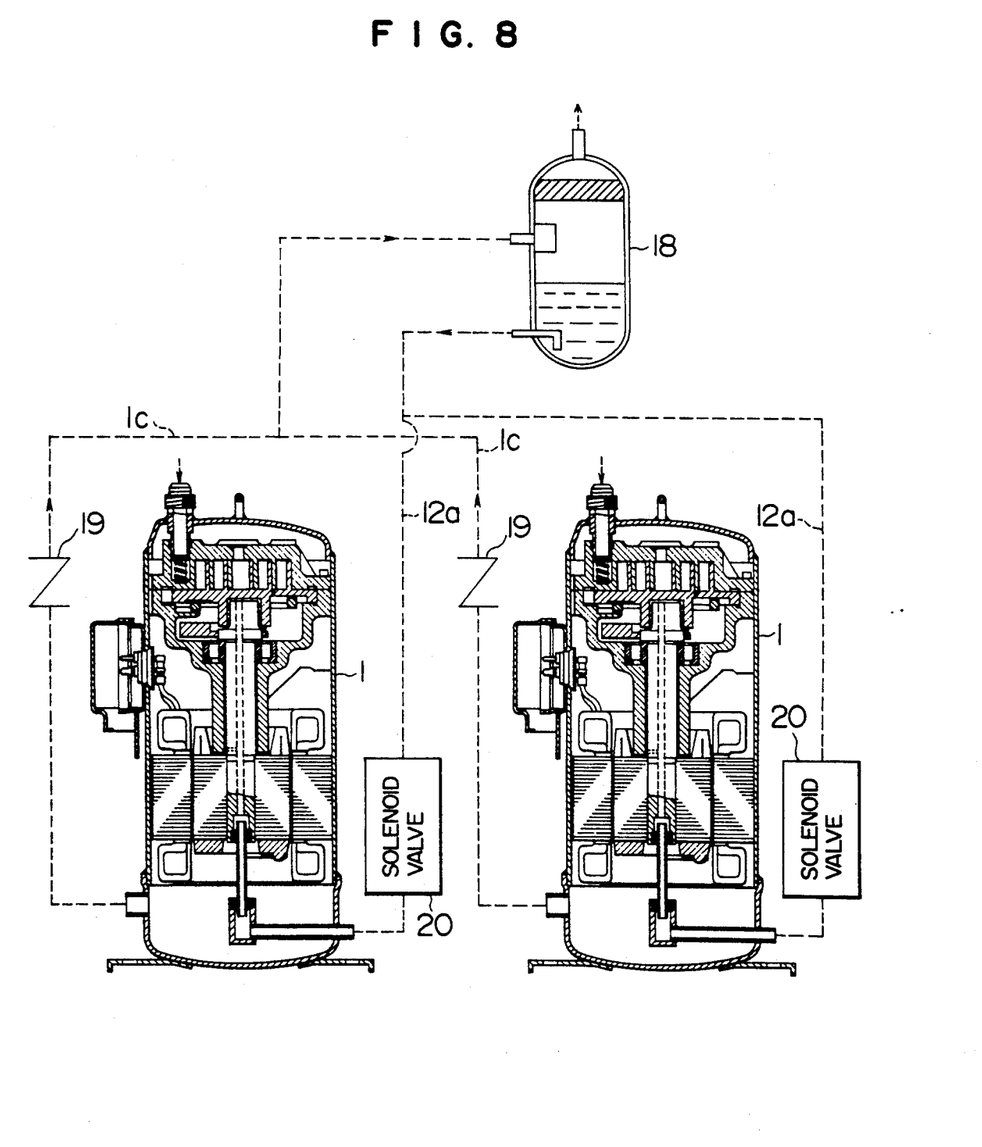
FIG. 8 is a diagram of a lubricating system used commonly for a plurality of compressors.

The lubricating system of FIG. 8, used for a refrigeration system employing a plurality of compressors which are independently controlled to start and stop, includes a discharge pipe 1c from each compressor connected to the oil reservoir 18 via a check valve 19 which prevents pressurized refrigerant gas from flowing back into a compressor which is not operating. The oil supply pipe 12a leading to each compressor has a solenoid valve 20, with the solenoid valves 20 being suitably controlled to open and close such that the lubricating oil is supplied only to the compressor or compressors which is or are operating. It will be seen that the arrangement of FIG. 8 enables lubrication of a plurality of hermetic scroll compressors which are independently controlled.

Although the embodiments described in connection with FIGS. 4 to 8 are of vertical-type having a drive shaft arranged vertically, it is to be understood that the features described in connection with FIGS. 4–8 can be applied also to horizontal closed type scroll compressors having drive shafts laid horizontally.

As will be understood from the foregoing description, according to the present invention, a lubricating oil passage bore formed in a drive shaft for driving a compression mechanism communicates with an oil reservoir through a joint which has a spherical slide bearing on the end thereof adjacent the driving motor for driving the drive shaft. The spherical slide bearing takes up any dimensional or mounting error incurred during the assembly, while taking up displacement of the drive shaft not only in the axial direction but also in all other directions. Consequently, the closed type scroll compressor of the present invention can be fabricated easily without any risk of uneven or local contact which may otherwise occur in each sliding portion.

When the lubricating oil is supplied from an oil reservoir which is separately provided outside the compressor and which has an oil separating function, circulation of the lubricating oil through the refrigeration cycle is suppressed to greatly improve the efficiency of the refrigeration cycle.

Furthermore, it is possible to lubricate a plurality of independently-controlled closed type scroll compressors with a single external oil reservoir by connecting the compressors to the oil reservoir through discharge pipes having check valves and through oil supply pipes having independently-operable solenoid valves.

What is claimed is:

1. A refrigerant compressor system including at least one closed type scroll compressor and a substantially closed oil reservoir, said compressor comprising a compression mechanism including stationary and orbiting scroll members each having a base plate and a spiral wrap integral with the base plate, said stationary and orbiting scroll members being arranged with their wraps meshing with each other to define a compression chamber, an anti-rotation mechanism for preventing said orbiting scroll member from rotating about its own axis, a drive shaft for causing said orbiting scroll member to orbit relative to said stationary scroll member, a frame for rotatably supporting said drive shaft and cooperating with said orbiting scroll member to define therebetween a back pressure chamber communicated with said compression chamber in an intermediate stage of its compression stroke, and bearings disposed between said frame and said drive shaft and subjected to a pressure in said back pressure chamber;

an electric driving motor drivingly connected to said drive shaft; and a hermetic casing accommodating said compression mechanism and said driving motor;

said drive shaft having formed therein an axially extending oil passage bore defining a lubricating oil passage through which a lubricating oil is supplied to said bearings, said lubricating oil passage bore terminating in an opening in an end of said drive shaft remote from said compression mechanism;

said reservoir being disposed outside said hermetic casing;

lubricating oil supply passage means hydraulically connecting said opening of said lubricating oil passage bore to said reservoir;

said casing being connected to said reservoir through a compressed gas discharge pipe;

said stationary scroll member having formed therein a discharge port communicating the interior of said hermetic casing with said compression chamber in a final stage of its compression stroke whereby compressed refrigerant containing lubricating oil is discharged from said compression mechanism through said discharge port and flows through said hermetic casing and said compressed gas discharge pipe into said oil reservoir and is separated in said oil reservoir from the lubricating oil, the separated lubricating oil is pressurized in said oil reservoir by the compressed refrigerant and forced to flow from said oil reservoir through said lubricating oil supply passage means into said lubricating oil passage bore in said drive shaft so as to be supplied to said bearing;

said lubricating oil supply passage means including a lubricating oil supply pipe member hermetically fixed to and extending through a wall of said hermetic casing and having an end open to the interior of said casing, a joint tube extending between said end of said lubricating oil supply pipe member and said opening of said lubricating oil passage bore in said drive shaft, and first and second bearing means substantially sealingly connecting opposite ends of said joint tube to said end of said lubricating oil supply pipe member and said opening of said lubricating oil passage bore, respectively, such that said opposite ends of said joint tube are movable at least in axial directions of said end of said lubricating oil supply pipe member and said opening of said lubricating oil passage bore, respectively; and at least one of said first and second bearing means comprises a spherical slide bearing for enabling an associated end of said joint tube to be movable not only in the axial direction of said associated end of said joint tube but also angularly relative to an associated one of said drive shaft and said lubricating oil supply pipe member.

2. A refrigerant compressor system according to claim 1, wherein a plurality of said closed type scroll compressors are arranged such that each of said hermetic casings are connected to said oil reservoir through said compressed gas discharge pipe and said lubricating oil supply passage means, said compressed gas discharge pipe having a check valve mounted thereon, said lubricating oil supply passage means having a solenoid valve mounted thereon.

3. A compression system according to claim 1, wherein said compressed gas discharge pipe is connected to a portion of said hermetic casing which is on the side of said motor opposite to said compression mechanism.

4. A refrigerant compressor system according to claim 1, wherein both of said first and second bearing means comprise spherical slide bearings.

5. A refrigerant compressor system according to claim 1, wherein the bearing means connecting said joint tube to said lubricating oil passage bore comprises a spherical bearing.

6. A refrigerant compressor system according to claim 1, wherein the bearing means connecting said joint tube to said lubricating oil supply pipe member includes said spherical slide bearing.

* * * * *